United States Patent [19]

Ito et al.

[11] Patent Number: 5,245,359
[45] Date of Patent: Sep. 14, 1993

[54] RECORDING APPARATUS WITH RECORDING HEAD CARRIAGE DRIVING MOTOR CONTROL

[75] Inventors: Noriaki Ito; Soichi Hiramatsu, both of Yokohama, Japan

[73] Assignee: Canon Kabushiki Kaisha, Tokyo, Japan

[21] Appl. No.: 723,335

[22] Filed: Jun. 28, 1991

[30] Foreign Application Priority Data

Jul. 2, 1990 [JP] Japan .................. 2-172788
Sep. 22, 1990 [JP] Japan .................. 2-252418

[51] Int. Cl.⁵ ............... G01D 15/16; G05B 19/40; H02P 8/00; B41J 29/38
[52] U.S. Cl. ................. 346/139 R; 318/685; 318/696; 400/903
[58] Field of Search .......... 346/140 R, 75, 139 R; 318/671, 685, 696; 400/303, 903

[56] References Cited

U.S. PATENT DOCUMENTS

| | | |
|---|---|---|
| 4,558,333 | 12/1985 | Sugitani et al. |
| 4,723,129 | 2/1988 | Endo et al. |
| 4,740,796 | 4/1988 | Endo et al. |
| 4,928,050 | 5/1990 | Torisawa et al. ............ 318/696 |
| 4,963,808 | 10/1990 | Torisawa et al. ............ 318/685 |
| 4,999,558 | 3/1991 | Onodera et al. ............. 318/685 |
| 5,029,264 | 7/1991 | Ito et al. ..................... 318/685 |
| 5,032,779 | 7/1991 | Takahashi .................... 318/696 |

FOREIGN PATENT DOCUMENTS 59-123670 7/1984 Japan.
62-193548 8/1987 Japan.
62-193549 8/1987 Japan.

Primary Examiner—Benjamin R. Fuller
Assistant Examiner—Eric Frahm
Attorney, Agent, or Firm—Fitzpatrick, Cella, Harper & Scinto

[57] ABSTRACT

This invention discloses a recording apparatus for effecting recording by moving a carriage which supports a recording head, along a recording material. The apparatus is provided with a motor speed controller for a closed-loop control of the rotating speed of a carriage driving motor. The speed control output signal from the motor speed controller is set at a predetermined value when the carriage driving motor reaches a speed of the constant speed control from an acceleration state.

7 Claims, 13 Drawing Sheets

RECORDING APPARATUS WITH RECORDING HEAD CARRIAGE DRIVING MOTOR CONTROL

BACKGROUND OF THE INVENTION

1. Field of the Invention

The present invention relates to a recording apparatus, and more particularly to a serial recording apparatus employing a stepping motor as a driving source at least for scanning movement of a recording head.

2. Related Background Art

A serial recording apparatus generally employs, for driving a carriage for moving a recording head for scanning movement for recording, a brushless motor or a stepping motor of hybrid type or permanent magnet type.

Such brushless motor generally employs a Hall element for detecting the position of magnetic poles of a rotor, for the purpose of current supply control, and an optical or magnetic encoder for detecting the rotor speed.

However, such brushless motor has been associated with the following drawbacks:

(1) The Hall element has to be aligned with the magnetic poles of the stator; and (2) The current supply switching by the Hall element fixes the positional relationship between the Hall element and the stator, so that the current supply method to the motor becomes unflexible. For example, the position of the Hall element is electrically different by 45° with respect to the magnetic poles of the stator for so-called 180° current supply control and 90° current supply control. Therefore, in order to effect both control methods in a same motor, the Hall elements have to be doubled in number and be positioned suitably for respective control methods.

For example the Japanese Laid-Open Patents Sho 62-193548 and Sho 62-193549 propose a stepping motor with current supply control utilizing the output of an encoder, but these patents only disclose the motor structure with an encoder in a predetermined position and do not teach any control circuit or method for driving such motor.

The U.S. Pat. No. 4,963,808 discloses a control device for a stepping motor, in which an encoder, having detection units of a number corresponding to an integral multiple of the number of the magnetic poles of the rotor, is fixed on the shaft of said rotor, then the number of said detection units of said encoder is counted in the course of rotation of said rotor at a predetermined position in the stator, and the current supply to the stator coils is switched when the obtained count reaches a predetermined value. In this manner a closed-loop control is applied on the stepping motor.

Conventional drive control for the stepping motor has been conducted by a simple open-loop control of the number of driving pulses for said motor and the frequency of said pulses.

When a stepping motor driven with such conventional open-loop control is employed as the carriage driving motor, there are generated high-pitched noises, in the course of movement of the carriage, resulting from the vibration of rotor, particularly in the hybrid type motor. Also at the starting, stopping and reversing of the carriage or of the stepping motor, there is generated a large "thud" sound because the stepping motor is started or stopped while it vibrates. These noises become a problem particularly in a quiet printer, such as an ink jet printer or a bubble jet printer.

On the other hand, the brushless motor, requiring a longer start-up time, is not suitable for the carriage driving motor which has to repeat starting, stopping and reversing in almost every line, and a high-speed recording cannot be achieved with such brushless motor.

Also the U.S. patent application Ser. No. 302,196 filed Jan. 27, 1989, now U.S. Pat. No. 4,928,050 proposes a recording apparatus utilizing a stepping motor as the drive source for moving the recording head for scanning, provided with detection means for detecting the angular position of the rotor of said stepping motor, and control means for closed-loop control of drive of said stepping motor according to the result of detection by said detection means.

In said closed-loop control of the stepping motor, an encoder is mounted on the shaft of the stepping motor, and the output signals of said encoder are counted for detecting the rotary position and the motor driving signal is switched at a predetermined count.

Said encoder generates, in the course of rotation of the rotor, pulse signals of which number is proportional to the amount of rotation. An example of such pulse signals are shown in FIG. 7.

In FIG. 7, the signals from the encoder are composed of two-phase signals A, B, which are converted, by a decoding circuit, into a rotational direction signal and a rotational amount pulse signal shown also in FIG. 7. Receiving these signals, the control unit of the printer determines the rotating speed of the carriage motor by measuring the interval of the rotation amount signal with an internal timer. The control unit detects the rotation state of the carriage motor, constantly compares the actual rotating speed of said motor with a speed for speed control stored in advance in a memory, and generates a motor control signal for example by a PWM signal. For effecting such control, the control unit generally effects PI (proportional integration) control in which released is the sum of an amount proportional to the error between the control speed (designated speed) and the actual speed, and an amount proportional to the integrated value of said error.

However, in a serial printer, the waiting time of the carriage motor from the stopping to the next starting, for example at the reversing of the carriage, becomes shorter as the recording speed becomes higher. In certain recording data, the carriage may be started in the opposite direction almost at the same time with the stopping. The speed change in such case is shown in FIG. 15.

FIG. 15 shows the speed change of the carriage in case of starting a recording process at a constant speed in the reversed direction, after a recording process at a high speed.

In FIG. 15, a line 61 indicates the speed of the carriage motor instructed by a speed control unit, while a line 62 indicates the actual speed. When the carriage moving at a high speed enters a deceleration stage, the carriage tends to maintain the current speed, by the inertia of the motor and the carriage. For this reason, the decrease of the actual speed (62) is delayed from the instructed speed (61). Thus, as shown at a time 63, even after the instructed speed reaches zero, the carriage still has a certain retentive speed as indicated by "a".

Then, even after a next acceleration is instructed by the control unit, the carriage still continues deceleration by inertia as indicated by the lines 62, so that the discrepancy in speed from the instructed speed, indicated by the line 61, becomes even larger. Consequently the integrated error also increases progressively. As a result, the control unit increases the instructed speed in order to reduce the error in speed, whereby the discrepancy between the actual motor speed and the instructed speed becomes even greater. Consequently the carriage motor is controlled with a large acceleration, thus eventually resulting in generation of large noises.

In such control, when the carriage speed becomes constant, the integrated speed error accumulated to this point is discharged at once to result in an overshooting and ensuing speed variations. The recording operation, during the presence of such speed variations, may result in fluctuation of the recording position, eventually deteriorating the quality of recording.

The recording operation may be started not during but after said overshooting phenomenon, but such method sacrifices the advantage of short start-up of the carriage movement in the acceleration region.

SUMMARY OF THE INVENTION

In consideration of the foregoing, the principal object of the present invention is to provide a recording apparatus capable of setting the integrated value of speed control at a predetermined value when the motor rotation reaches a constant controlled speed, thereby stabilizing the rotation speed of the motor.

Other objects of the present invention will become apparent from the following description of the preferred embodiments.

DETAILED DESCRIPTION OF THE PREFERRED EMBODIMENTS

Now the present invention will be clarified in detail by preferred embodiments thereof shown in the attached drawings.

Figure 1:
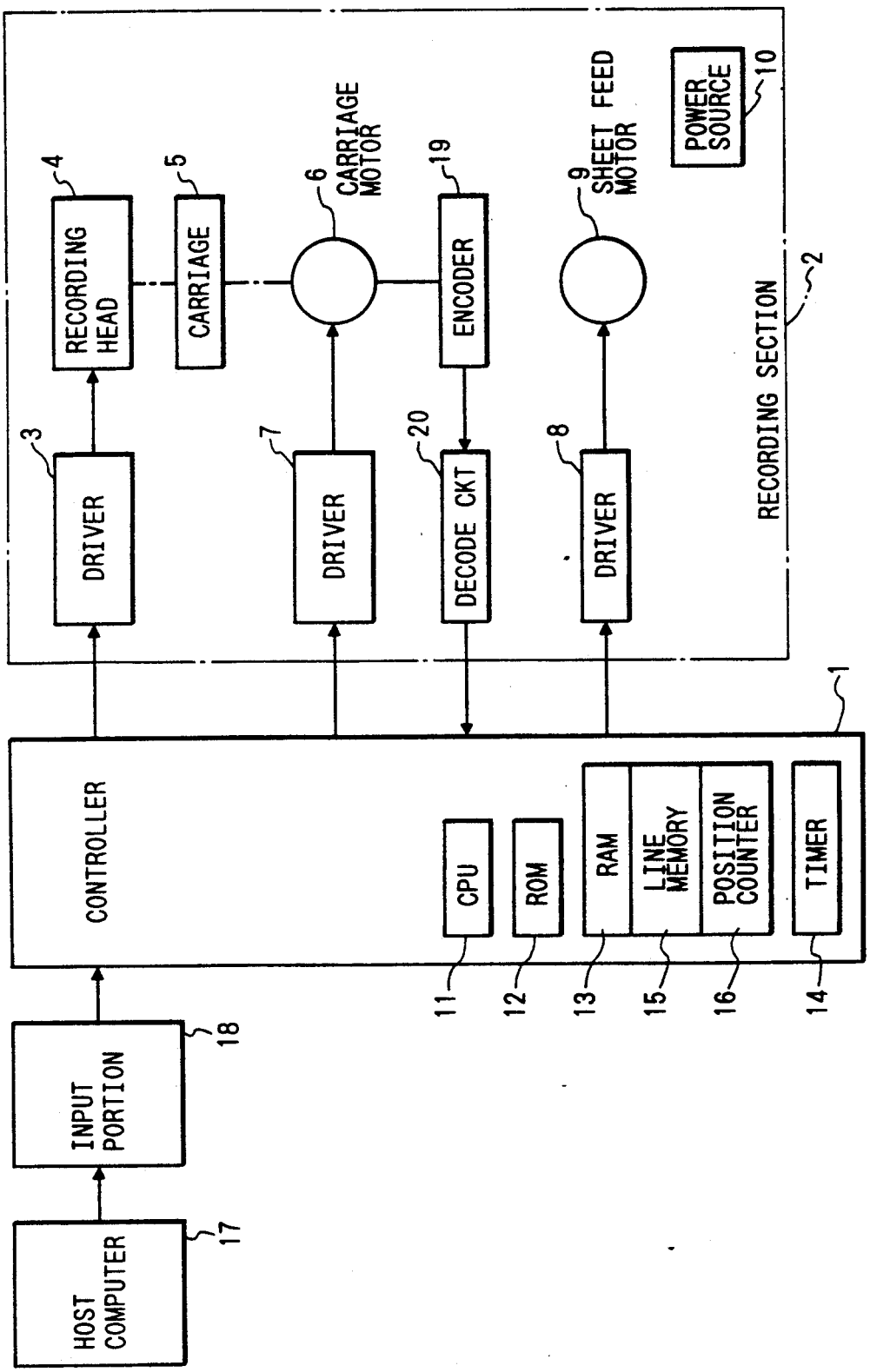
FIG. 1 is a block diagram of a carriage drive control system of a recording apparatus constituting a first embodiment of the present invention.

Description of Ink Jet Printer (FIG. 1)

FIG. 1 is a block diagram of the schematic structure of an ink jet printer constituting an embodiment of the present invention.

A controller 1 processes the data received from a host computer 17 and controls the entire printer. A recording unit 2 is equipped with a printer mechanism. The host computer 17 sends recording data and various recording control commands to the printer. An input unit 18 effects reception of the recording data, and interface control on the communication with the host computer 17.

In the controller 1, a CPU 11, such as a microcomputer, executes various controls according to programs stored in a ROM 12. A RAM 13 is used as a work area of the CPU 11, and stores various data received from the host computer 17 or related to the control operations of the CPU 11. Said RAM 13 contains, for example, a line memory 15 for storing the recording data of a line, and a position counter 16 for storing the scanning position of the carriage. A timer 14 receives time data from the CPU 11, and, after counting time corresponding to the said time data, sends an interruption signal to the CPU 11 thereby informing the lapse of the instructed time.

The recording unit 2 is constructed in the following manner. A recording head 4 of ink jet system is driven by a driver 3, according to the recording data from the controller 1. A carriage 5 supporting the recording head 4 is driven by a carriage motor 6, which is composed of a stepping motor and rotated by a driver circuit 7.

Figure 7:
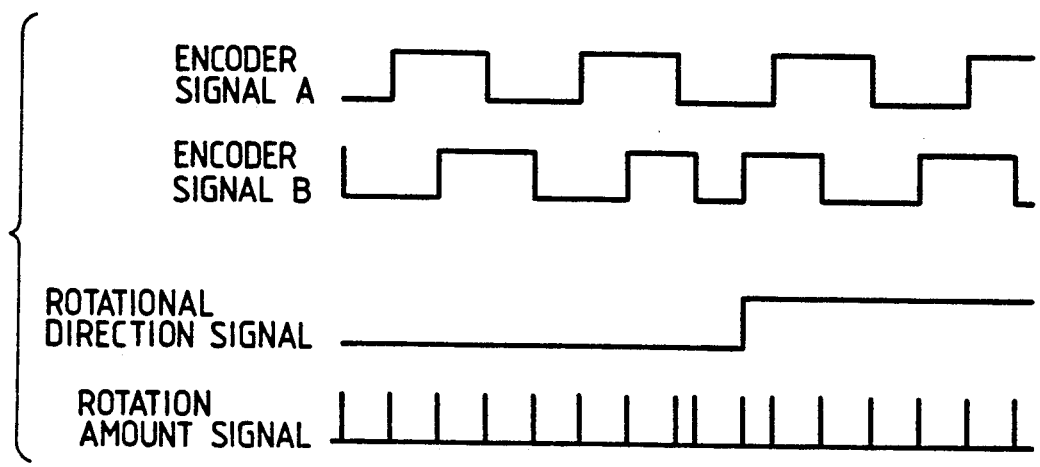
FIG. 7 is a chart showing the relationship between input and output signals in an encoder circuit shown in FIG. 1.

An encoder 19 includes for example, slits formed on a disk mounted on the shaft of the carriage motor 6, which are detected by a photointerruptor to generate two-phased pulses as shown in FIG. 7. A decoding circuit 20 receives the pulse signals from the encoder 19 and generates signals indicating the rotating direction and amount as shown in FIG. 7. A sheet feeding motor 9, composed for example of a stepping motor, is driven by a drive circuit 8 according to commands from the controller 1. A power source 10 supplies the entire apparatus with electric power.

Figure 2:
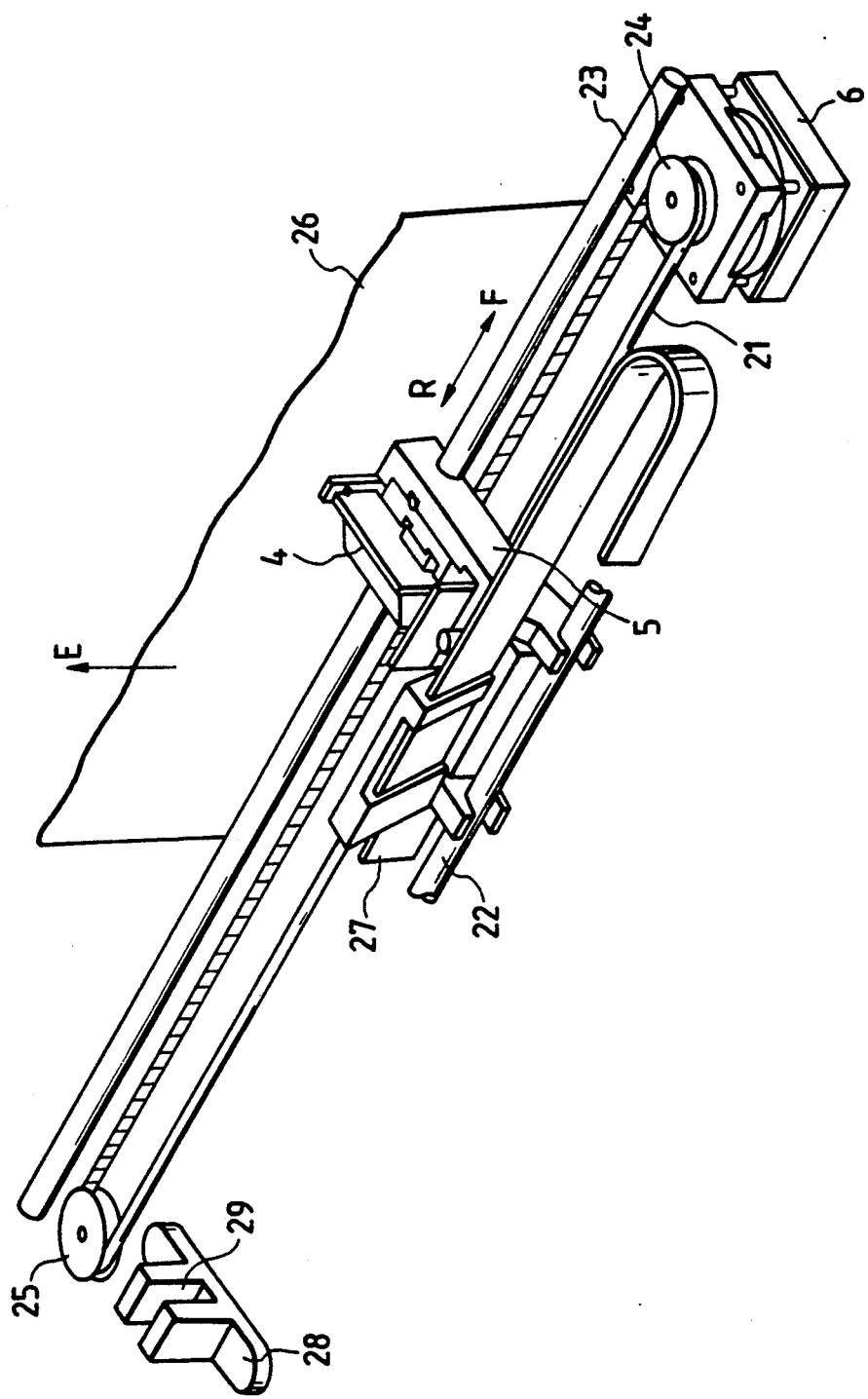
FIG. 2 is a schematic perspective view of a recording unit shown in FIG. 1.

Description of Recording Unit (FIG. 2)

FIG. 2 is an external perspective view of the principal part of the recording unit 2 in the ink jet printer of the present embodiment.

There are shown the ink jet recording head 4; the carriage 5 supporting said recording head 4 and reciprocating in the directions F, R along guide shafts 22, 23; a timing belt 21 supported between pulleys 24, 25 and connected at the ends to said carriage 5; the carriage motor 6 for moving the carriage 5 through said timing belt 21; and a recording sheet 26 positioned at a position opposite the recording head 4 by means of an unrepresented platen, and subjected to image recording in successive manner by the scanning motion of the carriage 4.

The carriage 5 is provided with a shield plate 27, and the arrival of the carriage 5 at a home position is detected when said shield plate 27 intercepts the light to a slit 29 of a photosensor 28. Upon said detection, the position counter 16 of the RAM 13 is initialized to "0". Then, as the carriage 6 moves to the right, in the direction F, from said initial position, the position counter 16 of the RAM 13 is stepwise increased by the signals from the aforementioned decoding circuit 20, thereby detecting the position of the carriage 6. At the same time an image recording operation is conducted on the recording sheet 26. After the carriage has moved corresponding to the recording of a line, the sheet feeding motor 9 is rotated by a predetermined amount to advance the recording sheet 26 by a line amount in a direction E.

The above-mentioned ink jet recording head 6 is provided with electrothermal converters for generating thermal energy, and effects image recording by discharging ink from discharge openings, utilizing the pressure changes generated by expansion and contraction of bubbles generated by film boiling phenomenon, which is induced by thermal energy from said electrothermal converters. The details of said recording head will be explained later.

Figure 3:
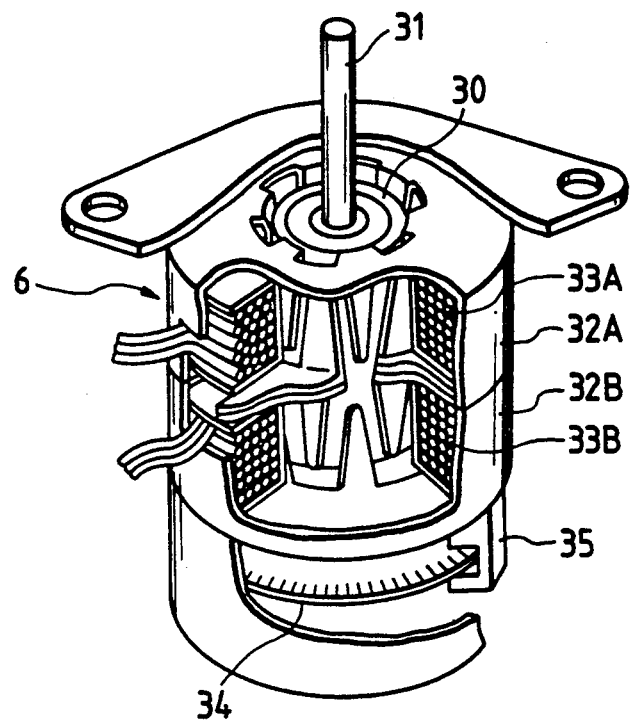
FIG. 3 is a partially cut-off perspective view of a carriage driving motor shown in FIGS. 1 and 2.
Figure 4:
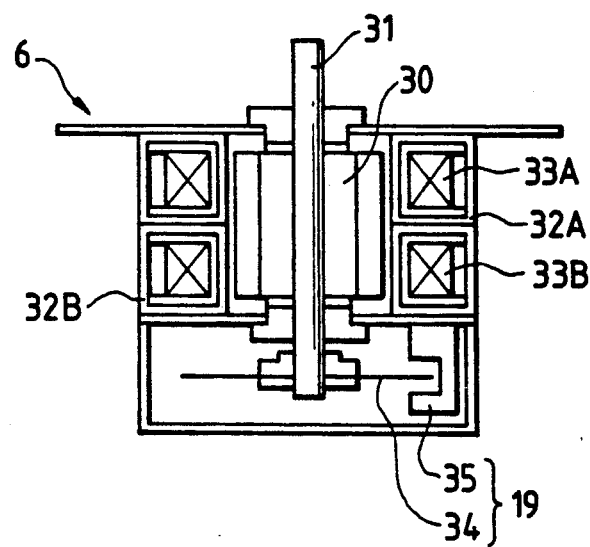
FIG. 4 is a cross-sectional view of the motor shown in FIG. 3.

FIG. 3 is a partially cut-off perspective view of an example of the carriage motor 6, and FIG. 4 is an axial cross-sectional view of said motor.

Referring to FIGS. 3 and 4, the encoder 19 corresponds to the one shown in FIG. 1. There are shown a rotor 30; a rotor shaft 31; stators 32A, 32B positioned around the rotor 30; field coils 33A, 33B; a detecting disk 34 of the encoder, mounted on said rotor shaft 31; and a photointerruptor 35 fixed on the stator.

The rotational position of the carriage motor 6 can be detected by counting the output pulses of the rotary encoder 19, consisting of the detecting disk 34 and the photointerruptor 35.

In the following there will be explained the function of the above-explained structure, with reference to flow charts shown in FIGS. 5 and 6.

Figure 5:
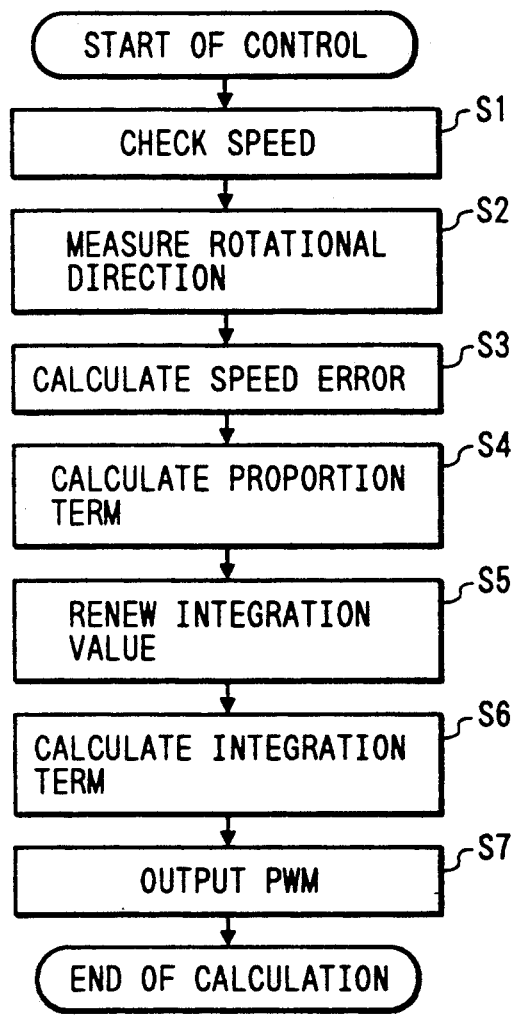
FIG. 5 is a flow chart of a speed control sequence in the carriage drive control system shown in FIG. 1.

FIG. 5 is a flow chart showing a speed control sequence of the carriage drive control system shown in FIG. 1. Said speed control sequence is conducted by a software in the CPU, usually at an interval of several milliseconds.

At first a step S1 detects the rotating speed of the carriage motor 6, based on signals from the encoder 19 mounted on said motor 6. Said rotating speed detection may also be conducted by counting the rotation amount signals from the decoding circuit 20, utilizing the timer 14 of the controller 1.

A step S2 detects the rotating direction of the carriage motor 6, by the rotational direction signal from the decoding circuit 20, because the moving direction of the carriage 5 has to be considered in the speed control. Then a step S3 determines the error between the speed instructed by the controller 1 and the actual rotating speed of the carriage motor 6 determined in the step S1.

The difference in said speeds becomes larger if the instructed rotating direction is different from the actual rotating direction of the carriage motor 6. Particularly at the reversing of the carriage 5, the rotating direction of the carriage motor 6 is also inverted, so that a calculation including the rotating direction is required. A step S4 determines a proportional component Pn in the PI (proportional integration) control by $Pn = Kp \times Ve$, wherein Ve is the speed difference and Kp is a constant. Then a step S5 renews the integrated error value.

Said step S5, constituting the feature of the present invention, will be explained later in greater detail.

Then a step S6 determines an integrated component In of the PI control from the integrated error value by $In = Ki \times IVe$, wherein IVe, is the integrated speed error and Ki is a constant. A next step S7 sends the sum of proportional component and integrated component (Pn + In) as the control output signal to the motor driver circuit 7.

Now the function of the integrated component in the speed control will be briefly explained.

If the constant-speed rotation control of a motor is conducted only by a component proportional to the speed error between the instructed rotating speed and the actual rotating speed, there is always generated a constant deviation, whereby the rotating speed of the motor does not reach the instructed speed. The integrated component is therefore added to reduce said constant deviation to "0". The value of said integrated component becomes almost constant. Therefore an integrated error value, corresponding to the rotating speed in the course of constant-speed control, is memorized in advance. Then, if the integrated error becomes very large for example in the acceleration control of the motor, and if a significant variation in the rotating speed, such as overshooting phenomenon, is anticipated, the memorized integrated error for the constant speed control is set instead, whereby the control output signal for the motor is approximately maintained at a level for rotating the motor at the final speed, and the significant variation in the rotating speed can therefore be avoided.

In the present embodiment, the rotation of the carriage motor 6 is always delayed, because of the inertia, from the instructed rotating speed. It is therefore anticipated that an overshooting always occurs at the transfer to the constant-speed control, and the integrated error is unconditionally set at a predetermined value when the rotation of the carriage motor 6 reaches a constant speed.

Figure 6:
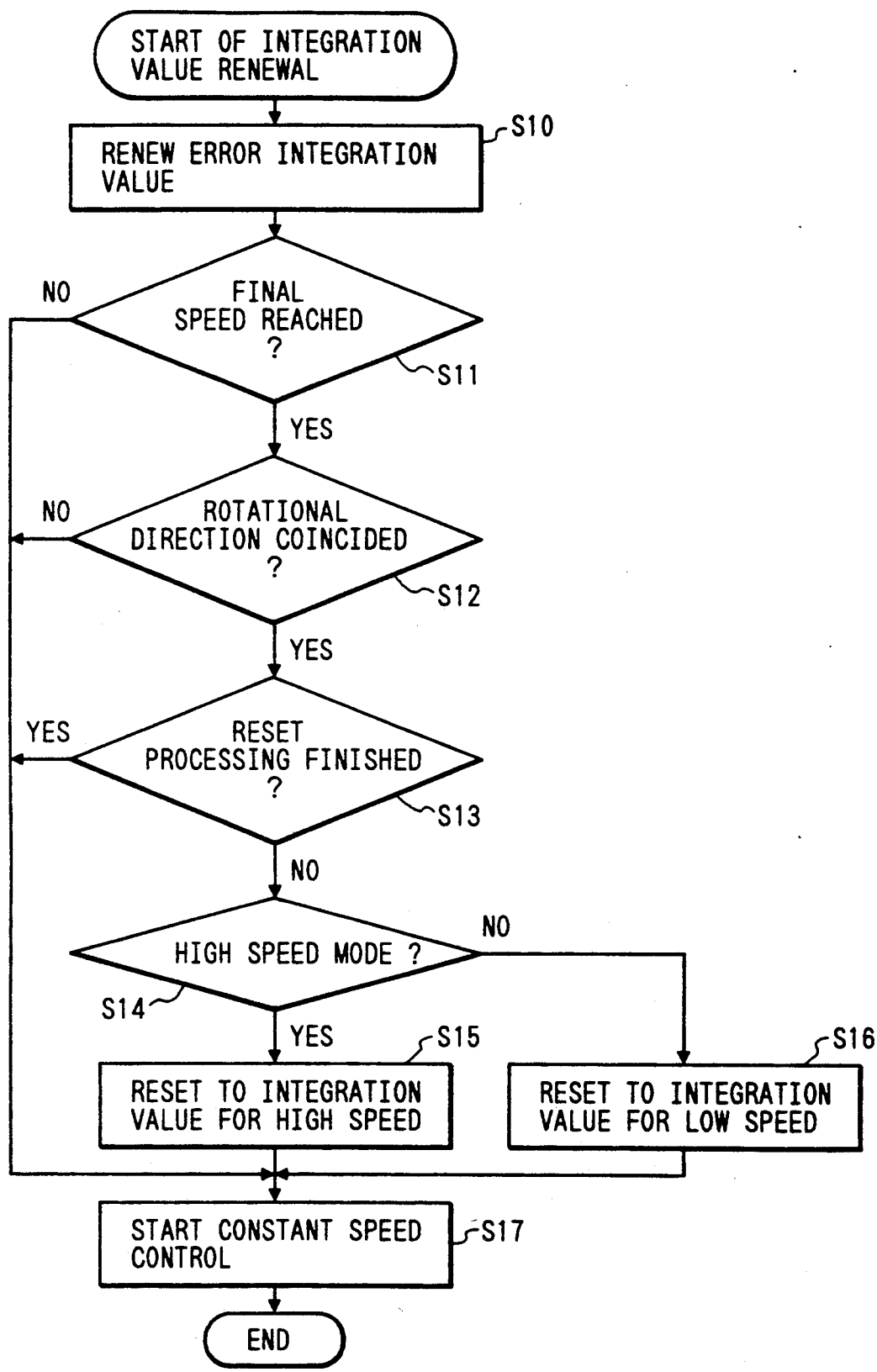
FIG. 6 is a flow chart of an integrated error renewing sequence in the carriage drive control system shown in FIG. 1.

FIG. 6 is a flow chart of a sequence for resetting the integrated error, in the step S5 shown in FIG. 5.

A step S10 renews the integrated error IVe, based on the speed error determined in the step S3 in FIG. 5, by an equation $IVe = IVe + Kiv \times Ve$, wherein Kiv is an integration constant. Then a step S11 discriminates whether the carriage motor 6 has reached the final rotating speed, and, if the rotating speed is lower than the final speed, the sequence proceeds to the step S6.

On the other hand, if the carriage motor 6 has reached the final speed, the sequence proceeds to a step S12 to discriminate the rotating direction of the carriage motor 6. If the actual rotating direction of the carriage motor 6 is same as the instructed rotating direction, the sequence proceeds to a step S13 to confirm whether the resetting (setting) of the integrated error value has been conducted before. If it has already been set, the sequence proceeds to a step S17 to initiate a constant-speed control.

On the other hand, if the step S13 identifies that the resetting has not been conducted, the sequence proceeds to a resetting sequence starting from a step S14. At first the step S14 discriminates the current control mode for the carriage motor 6, and, if it is the high-speed mode, a step S15 effects resetting to an integrated value for the high-speed mode. If it is not the high-speed mode, a step S16 effects resetting to an integrated value for the low-speed mode. Then the step S17 switches the rotation speed control for the carriage motor 6 to the constant-speed control.

Thus stable rotation control for the motor can be achieved as explained in the foregoing, without speed variations such as overshooting, even when a significant speed error is generated between the instructed motor speed and the actual motor speed, for example in the acceleration control.

Figure 8:
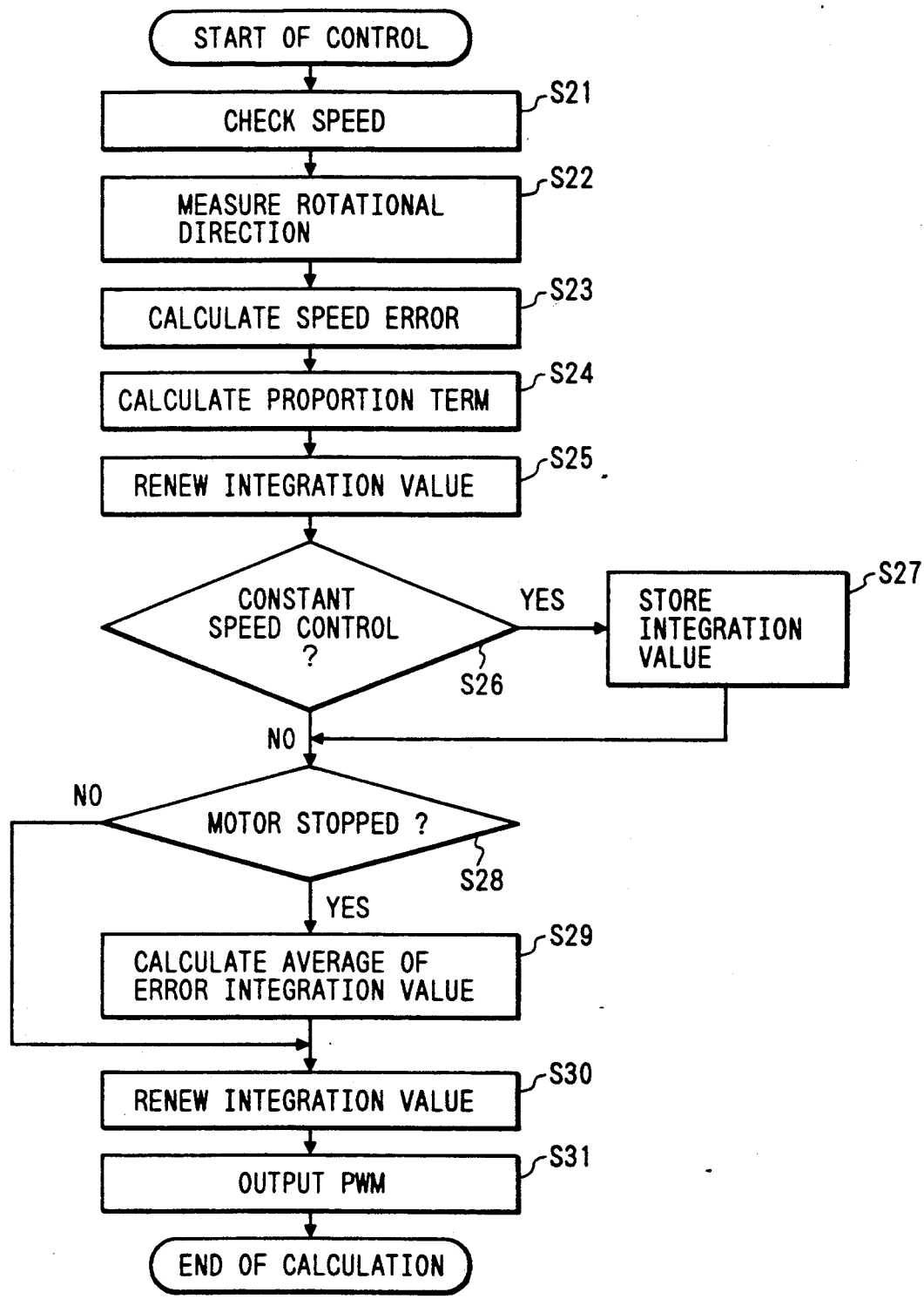
FIG. 8 is a flow chart of a variation of the speed control sequence in the carriage drive control system shown in FIG. 1.

FIG. 8 is a flow chart showing a variation in the speed control sequence in the carriage drive control system shown in FIG. 1. In contrast to the foregoing first embodiment in which the integrated value is set by a pre-memorized value, the present variation is characterized by a fact that the integrated error value in the recording operation of a preceding line (in constant-speed control) is stored for example in the RAM 13 and is used for resetting of the integrated value.

In FIG. 8, steps S21 to S25 are identical with the steps S1 to S5 in the first embodiment shown in FIG. 5. Then a step S26 discriminates whether the constant-speed control is currently exercised, and, if so, the current integrated error value is stored in the RAM 13. Then, when a step S28 stops the carriage motor 6 after a sequence of control operations, a step S29 determines the average of all the integrated error values and stores said average in the RAM 13.

Then a step S30 sets, in the speed control of the same mode, the average value in the RAM 13 as the integrated error value. The above-explained sequence enables rotation control of the carriage motor 6 according the state of the printer.

For example, even if the integrated component in the speed control fluctuates by change in the load of the carriage motor 6, the integrated error in such state is measured and is reflected in the succeeding control, whereby there can be achieved control matching the actual state of the printer.

Since the set value of the integrated error varies according to the control speed, as explained in the first embodiment, it is naturally necessary, also in the present second embodiment, to calculate the integrated error value according to the control mode and to store such calculated integrated error value for example in the RAM 13.

As explained in the foregoing, the present embodiment allows to stabilize the rotating speed of the motor by setting the integrated component of speed control at a predetermined value when the motor reaches a constant control speed, thereby preventing deterioration of recording quality and noise generation.

Another Embodiment

In the following there will be explained another embodiment of the present invention, with reference again to FIGS. 2 to 4. In the following description, same components as those in the foregoing embodiments are represented by same symbols or numbers and will not be explained further.

Figure 9:
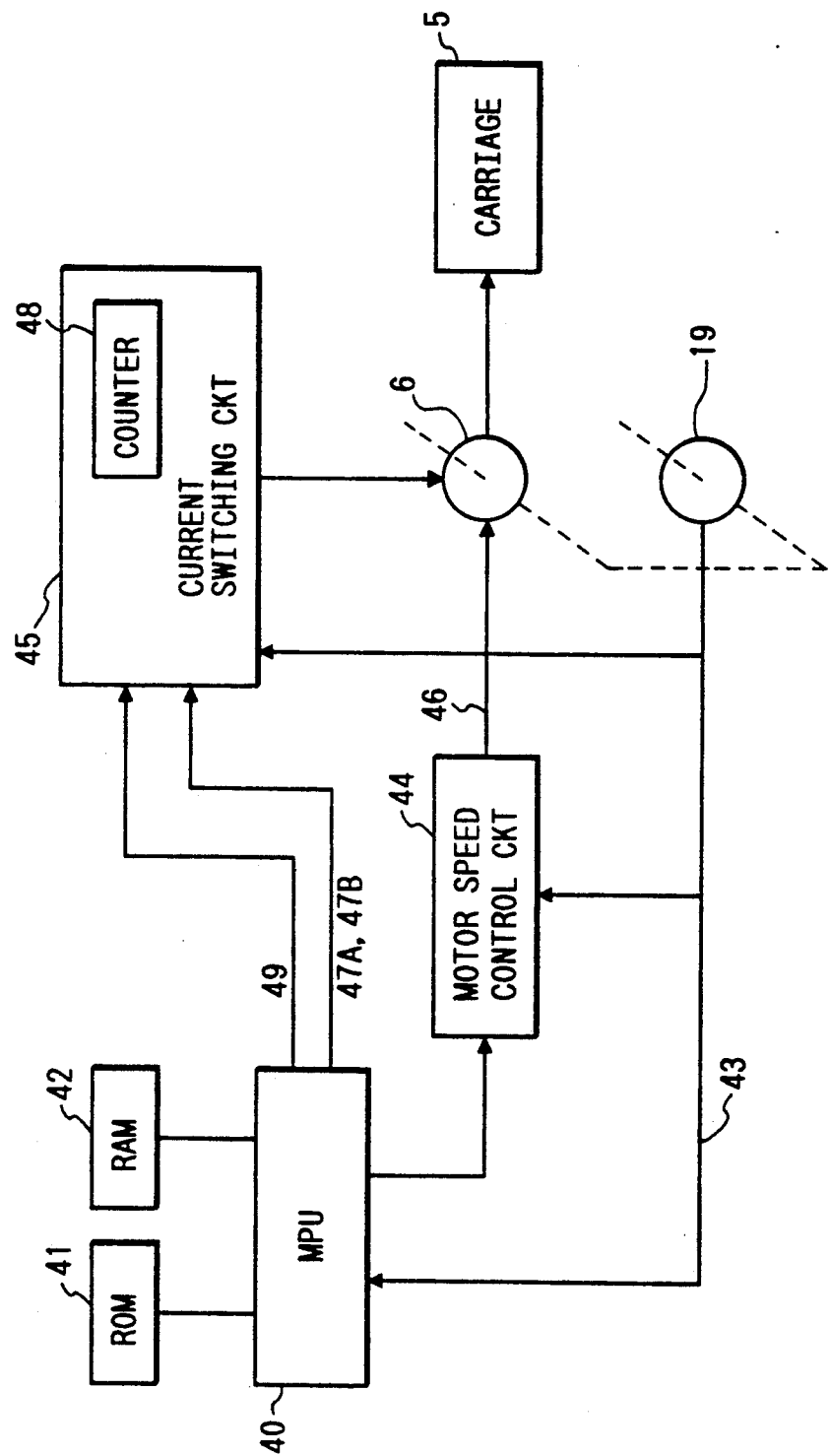
FIG. 9 is a block diagram of the carriage drive control system of the recording apparatus constituting another embodiment of the present invention.

FIG. 9 is a block diagram showing a closed-loop control system for the carriage motor in a recording apparatus of the present invention.

In FIG. 9, a MPU (microprocessor unit) 40 controlling the entire apparatus controls the various units and effects drive control of the carriage motor 6 for driving the carriage 5, according to control programs stored in the ROM 41 and data in the RAM 42.

Said MPU 40 is provided with a hardware or software counter (not shown), and detects the position of the carriage by counting the output pulses from the rotary encoder 19.

The MPU 40 also controls, through a motor speed control circuit 44, the rotating speed of the carriage motor 6 at the speed for a high-speed mode or that for a low-speed mode, and effects the starting and stopping of the carriage motor through a current switching circuit 45 for switching the energizing currents to the field coils 33A, 33B of the carriage motor 6.

Said motor speed control circuit 44 effects closed-loop control on the rotating speed of the carriage motor 6, based on the detection output of the encoder 19. More specifically, it compares the interval of the output pulses 43 from the encoder 19 with a predetermined reference time, and regulates the control output signal 46 to the carriage motor 6 so as to bring the difference in said comparison to zero.

In response to the instruction of a rotating speed of the carriage motor 6 given by the MPU 40, the motor speed control circuit 44 selects a reference time corresponding to said instructed speed, compares the pulse interval with said reference time and controls the rotating speed of the carriage motor 6 in the high- or low-speed mode.

Said current switching circuit 45 initiates a current switching operation in response to a start signal 47A from the MPU 40 thereby starting the carriage motor 6, or in response to a stop signal 47B from the MPU 40 thereby stopping the carriage motor 6.

The motor speed control in the present embodiment is conducted by a change in the duty ratio (proportion of time in which the motor driving circuit is turned on) of the PWM signal for speed control.

More specifically, if the motor rotating speed is higher than the instructed speed, the duty ratio of the PWM signal is lowered, thereby reducing the energizing current to the motor and lowering the rotating speed thereof. On the other hand, if the motor speed is lower, the duty ratio of the PWM signal is increased to elevate the motor rotating speed.

In the following there will be explained an example of calculation of the duty ratio of the PWM signal, based on the instructed speed and the actual speed detected by the encoder 19, for the speed control of the carriage motor of the present embodiment.

Equations of calculation are as follows:

$$PWM = k_1 \cdot D_v + k_2 \cdot I_v + k_3 \cdot D_a + (k_4 \cdot I_a) \qquad (1)$$

$$D_v = V_i - V_r \qquad (2)$$

$$I_{v(n)} = I_{v(n-1)} + k_5 \cdot D_{v(n)}, \; I_{v(0)} = 0 \qquad (3)$$

$$D_{a(n)} = (V_{i(n)} - V_{i(n-1)}) - (V_{r(n)} - V_{r(n-1)}) \qquad (4)$$

$$I_{a(n)} = I_{a(n-1)} + k_6 \cdot D_{a(n)}, \; I_{a(0)} = 0 \qquad (5)$$

In the equation (2), $V_i$ indicates the ideal or instructed speed, while $V_r$ indicates the real speed detected by the encoder. $D_v$ indicates the difference between the instructed speed and the real speed.

In the equation (3), $I_v$ is the integrated component of speed, and is represented by the cumulative value of the difference between the instructed and real speeds multiplied by a coefficient $k_5$.

In the equation (4), $D_a$ indicates the difference between the instructed and real speeds.

More specifically, $V_{i(n)} - V_{i(n-1)}$ indicates the difference (instructed acceleration) between the current instructed speed and the instructed speed at the preceding sampling.

Also $V_{r(n)} - V_{r(n-1)}$ indicates the actual acceleration.

In the equation (5), $I_a$ indicates the integrated component of speed in (3), and also the integrated component of acceleration.

According to the equation (1), the control output value PWM is calculated from a component proportional to the difference between the instructed and real speeds (with a coefficient $k_1$), a component proportional to the integrated component of speed difference (with a coefficient $k_2$), a component proportional to the difference between the instructed and real accelerations (with a coefficient $k_3$), and a component proportional to the integrated component of the acceleration difference (with a coefficient $k_4$).

These coefficients are selected separately for equations at the acceleration at start-up and for equations at the constant-speed drive.

For example, in the present embodiment, $k_4$ is selected as "0" for the constant-speed drive, whereby the integrated component of the acceleration difference is eliminated.

The motor control at the start-up acceleration stage is conducted according to these calculating equations, whereby the motor is accelerated along the instructed speed curve. When the real motor speed reaches the speed of constant-speed drive, even if the control is still in the middle of said instructed speed curve, the control is forcedly shifted to the calculating equations for the constant-speed control and predetermined value is set in the integrated component of the speed difference to obtain a PWM output value.

Said predetermined value is for example set at the integrated component of the speed difference, experimentally calculated as an average in the constant-speed drive.

In the following there will be explained the function of the above-explained structure, with reference to a flow chart shown in FIG. 10.

Figure 10:
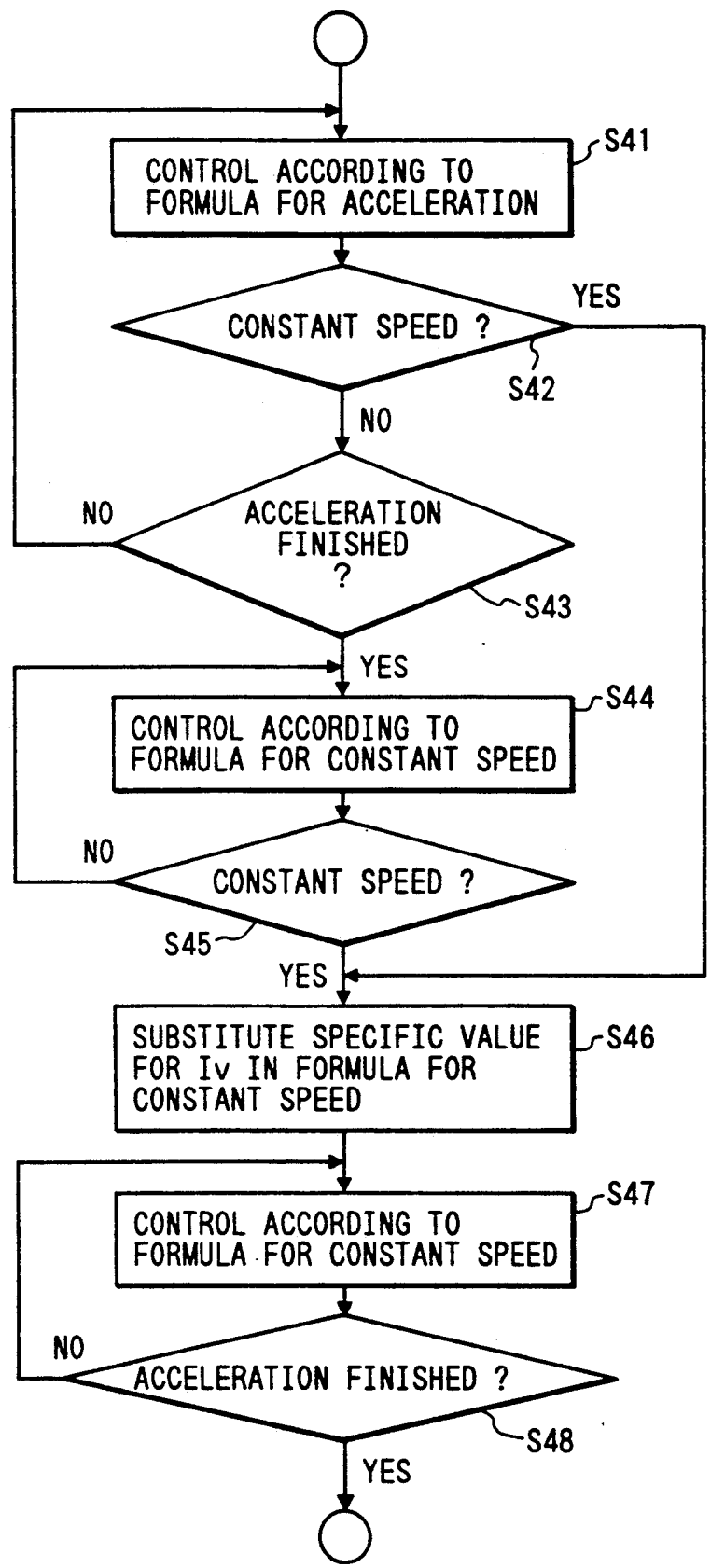
FIG. 10 is a flow chart of a speed control sequence of the carriage drive control system shown in FIG. 9.

In FIG. 10, in a state where the carriage motor 6 is stopped or reversed into a new rotating direction, a step S41 releases a PWM value obtained by the above-mentioned calculating equations for the start-up acceleration, thereby effecting speed control along an instructed speed curve.

Then a step S42 discriminates whether the real speed has reached the instructed constant speed, and, if not, a step S43 discriminates whether the instructed curve for acceleration stage has been completed. If not, there is continued output of the PWM value according to the equations for acceleration stage in the step S41.

If the step S43 identifies that the instructed curve for acceleration stage has been completed, a step S44 releases the PWM value according to the equations for constant speed.

The output of said PWM value in the step S44 is continued until a step S45 identifies that the real speed has reached the instructed speed in the constant speed control.

If the step S45 identifies that the real speed has reached the instructed speed in the constant speed control or the step S42 identifies that the real speed has reached the instructed speed in the acceleration stage, a step S46 employs the equations for constant speed control, with the aforementioned predetermined value in $I_v$ thereof, and releases the calculated PWM value.

A step S47 generates a control output signal, based on the PWM value obtained from said equations for constant speed control.

Said output in the step S47 according to the equations for constant speed control is continued until a step S48 identifies that the control curve for constant speed control has been completed.

Figure 11:
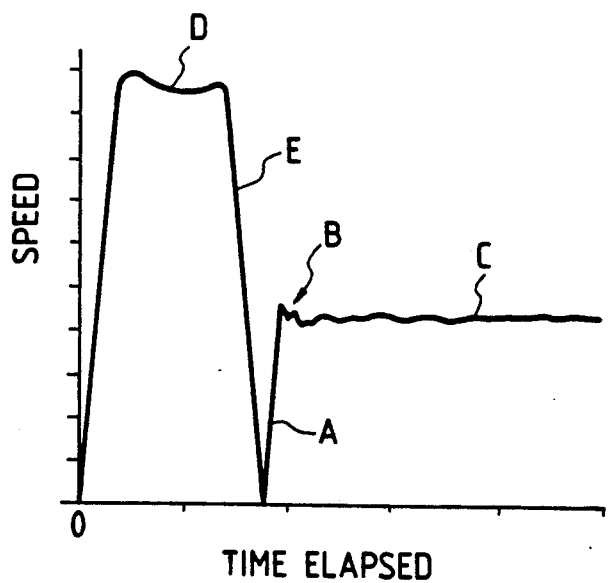
FIG. 11 is a chart showing the speed characteristics of the carriage drive control system shown in FIG. 9.

FIG. 11 is a chart indicating the speed of the carriage motor 6 when the speed control is conducted according to another embodiment explained above.

After the carriage moves at a high speed in the reversing direction (state D), it passes through a deceleration region E, then the movement is reversed into the recording direction to enter an acceleration region A. In the conventional recording apparatus, in the transfer from said acceleration region A to a constant speed region C for recording, an overshoot portion B larger than shown in FIG. 11 is inevitably generated. Thus, the control with the output value obtained according to the ordinary equations leads to formation of significant overshooting, because of the integrated component corresponding to the discrepancy from the speed control curve.

On the other hand, the aforementioned another embodiment sets the predetermined value when the speed of constant speed control is reached, whereby a PWM value substantially equal to that in the constant speed operation can be released. Thus the integration up to this point is also reset, and a PWM value required for maintaining the current speed can be released.

Thus the speed control according to another embodiment explained above allows to suppress the overshooting as shown in B in FIG. 11.

In FIG. 11, after a high-speed carriage returning in the region D and a deceleration in the region E, the moving direction is reversed and the acceleration in the recording direction is conducted within a short period as indicated by the region A. Even in such case, the overshooting B, at the boundary to the constant speed region C, is maintained very small.

In the above-explained embodiment, a predetermined value is released as the speed control output when the carriage motor 6 reaches from the acceleration state to the speed of constant speed control, so that there can be obtained a recording apparatus capable of easily suppressing the overshooting even in a rapid acceleration, thereby improving the throughput and preventing the deterioration in the recorded image.

Figure 12:
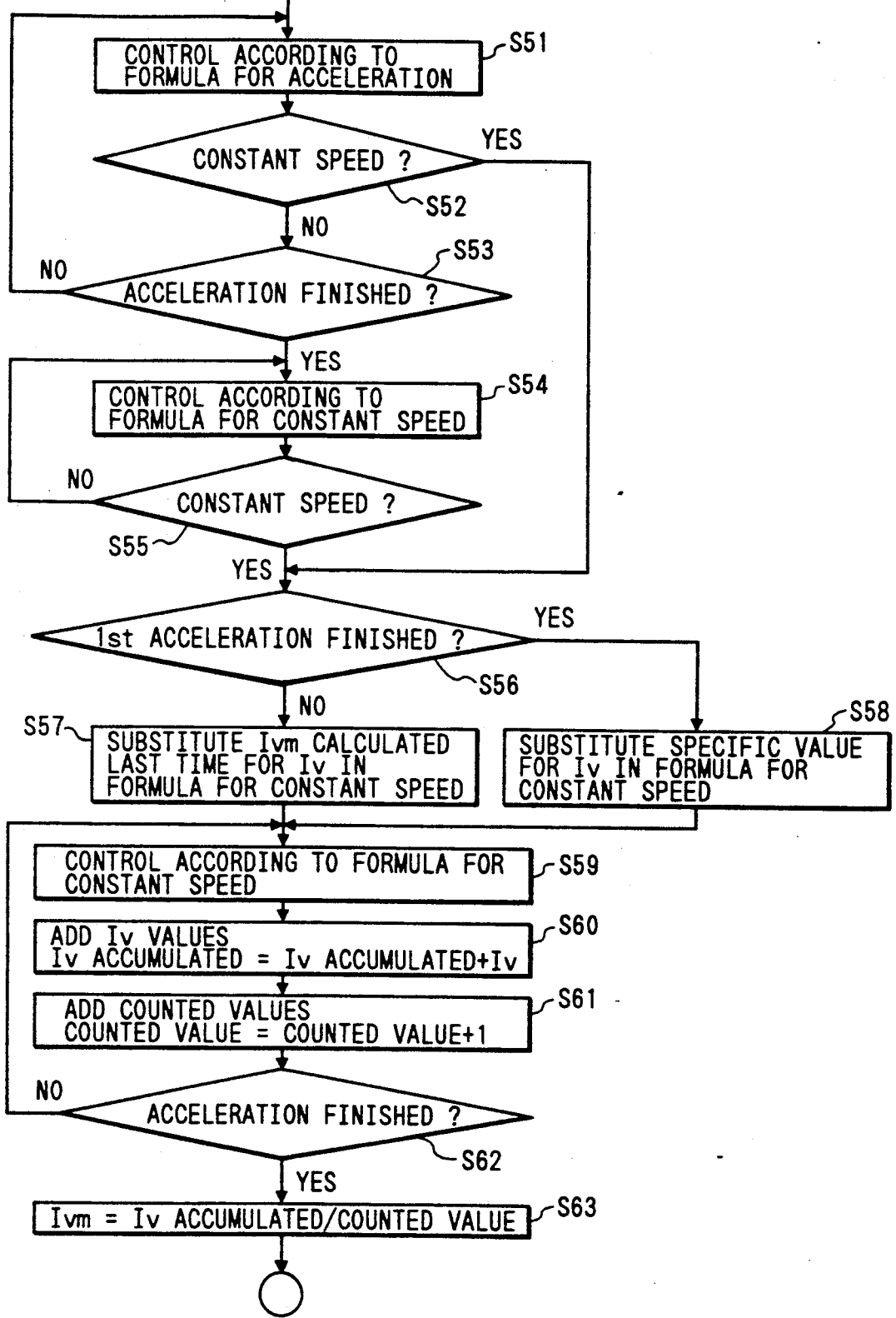
FIG. 12 is a flow chart showing another example of the speed control sequence of the carriage drive control system shown in FIG. 9.

FIG. 12 is a flow chart showing a variation of the speed control sequence in the carriage drive control system shown in FIG. 9. The speed control in said variation employs the calculated average of $I_v$ at the constant speed state at the end of next acceleration.

In FIG. 12, in a state where the carriage motor 6 is stopped or inverted in rotating direction, a step S51 releases a PWM value obtained from the aforementioned equations for start-up acceleration, thereby effecting speed control according the instructed speed curve.

Then a step S52 discriminates whether the real speed has reached the instructed speed of constant speed state, and, if not, a step S53 discriminates whether the instructed speed curve at acceleration stage has been completed. If not, the output of the PWM value obtained by the equations for acceleration stage in the step S51 is continued.

If the step S53 identifies that the instructed speed curve for acceleration stage has been completed, a step S54 effects the output of a PWM value according to the equations for constant speed control.

Said output of the PWM value in the step S54 is continued until a step S55 identifies that the real speed has reached the instructed speed for constant speed control.

If the step S55 identifies that the instructed speed for constant speed control has been reached, or if the step S52 identifies that the instructed speed for acceleration stage has been reached, a step S56 discriminates whether this is a first cycle after the power supply is turned on.

If not the first cycle, a step S57 generates a control output value by substituting a previously calculated average value $I_{vm}$ of the integrated component, to be explained later, for $I_v$.

On the other hand, if this is the first cycle, since the preceding calculated value is lacking, a step S58 generates a PWM value by substituting the predetermined value in the step S46 in FIG. 10, for $I_v$.

Subsequently steps S59 to S62 drive the carriage motor 6 according to the speed control based on the equations for constant speed control, until the instructed speed curve for constant speed control has been completed.

In these operations, the steps S60 and S61 accumulate the $I_v$ value at every sampling or every determined number of samplings, and count the number of accumulation by a counter.

When the step S62 identifies that the instructed speed curve for constant speed control has been completed, the step S63 calculates the average $I_{vm}$ of the values $I_v$, and stores the calculated result in the RAM.

The embodiment shown in FIG. 12 not only provides the advantages in the embodiment shown in FIG. 10, but also allows to avoid the influence of slight differences in the load specific to each recording apparatus or difference in load resulting from ambient conditions.

In the foregoing embodiments, the PWM value is so controlled to become equal to the value at the constant speed state, but the present invention is not limited to such case, and the aforementioned control may be conducted in a modified manner, such as employing a value slightly decreased by a predetermined proportion from the aforementioned value, in consideration of the influence immediately after the motor acceleration.

In the following there will be explained the serial bubble jet recording apparatus employed in the foregoing embodiments. Said bubble jet recording method is one of the ink jet recording methods.

Recording Principle of Bubble Jet Recording

Figure 13:
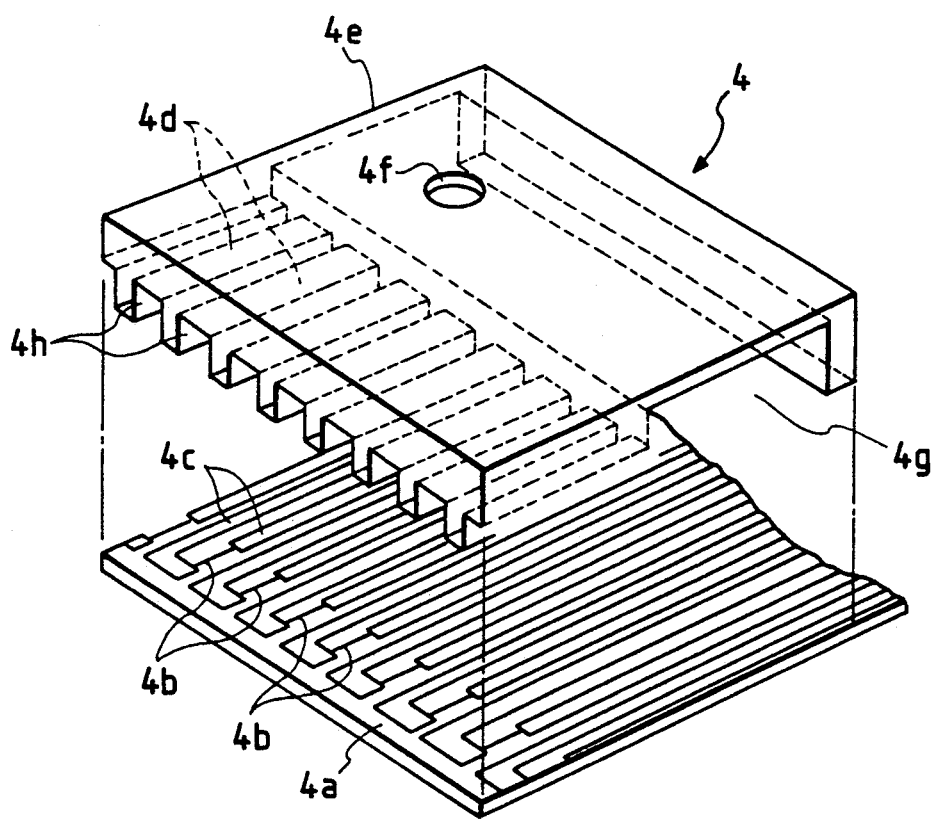
FIG. 13 is an exploded perspective view of an ink jet recording head.

FIG. 13 is an exploded perspective view of a recording head constituting recording means, and FIGS. 14A to 14G are schematic views showing the principle of bubble jet recording. The representative structure and principle are disclosed, for example, in the U.S. Pat. Nos. 4,723,129 and 4,740,796.

Referring to FIG. 13, a heater board 4a is composed of a silicon substrate on which electrothermal converters 4b (discharge heaters) and aluminum electrodes 4c for power supply to said converters are formed. The recording head is formed by adhering, to said heater board 4a, a cover plate 4e provided with partitions for separating liquid paths 4d. An exchangeable ink cartridge, for supplying said recording head with ink, is provided in a predetermined position of the apparatus. The ink supplied from said ink cartridge through a pipe is filled, through a supply aperture 4f formed in the cover plate 4e, in a common liquid chamber 4g in the recording head 4, and is then guided into the respective liquid paths 4d. Said liquid paths 4d are provided with ink discharge openings 4h, which are positioned opposite to the aforementioned recording sheet and arranged at a predetermined pitch along the advancing direction of said sheet.

In the present embodiment, the recording head 4 of the above-explained structure is mounted on the carriage 5 capable of reciprocating motion, and the image recording is conducted by discharge and flying of ink droplets from said recording head 4, in synchronization with the movement of said carriage 5.

Now reference is made to FIGS. 14A to 14G for explaining the principle of ink droplet flying in said bubble jet recording method.

Figure 14A:
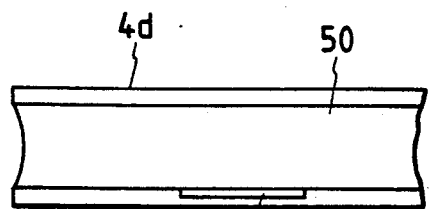
FIGS. 14A to 14G are views showing the recording principle of the bubble jet recording method.
Figure 14B:
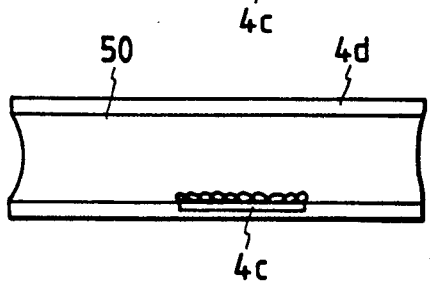
Figure 14C:
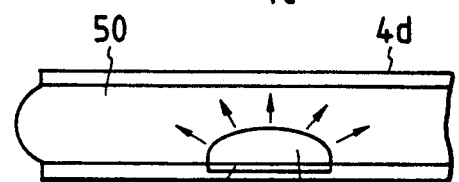

In a stationary state, as shown in FIG. 14A, the surface tension of the ink 50 in the liquid path 4d is in equilibrium with the external pressure at the plane of said discharge opening. In order to cause ink discharge from said state, the electrothermal converter 4b in the liquid path 4d is electrically energized to cause a rapid temperature increase exceeding the nucleate boiling in the ink in said liquid path 4d. Thus, as shown in FIG. 14B, the ink adjacent to the electrothermal converter 4b is heated to generate small bubbles. The ink in said heated portion gasifies to cause film boiling, and said bubble 51 grows rapidly as shown in FIG. 14C.

Figure 14D:
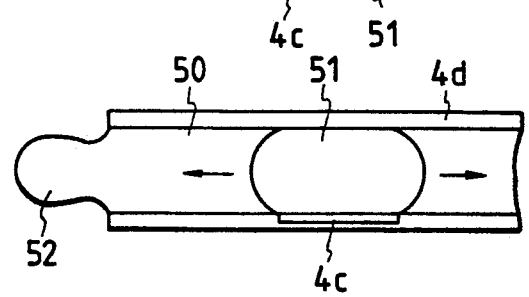
Figure 14E:
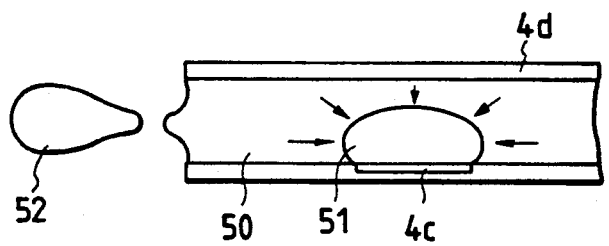
Figure 14F:
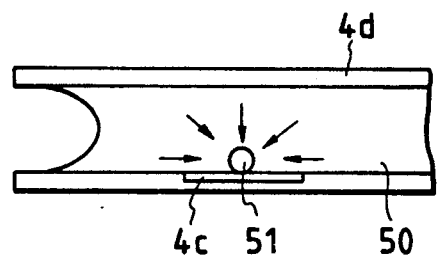
Figure 14G:
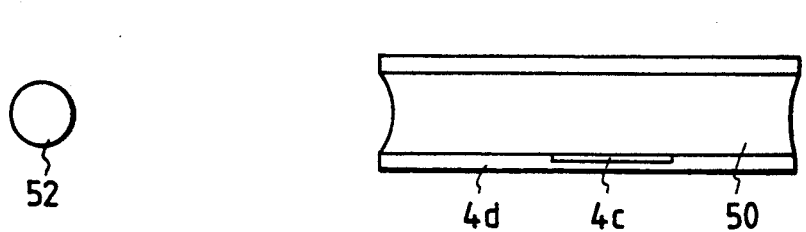
Figure 15:
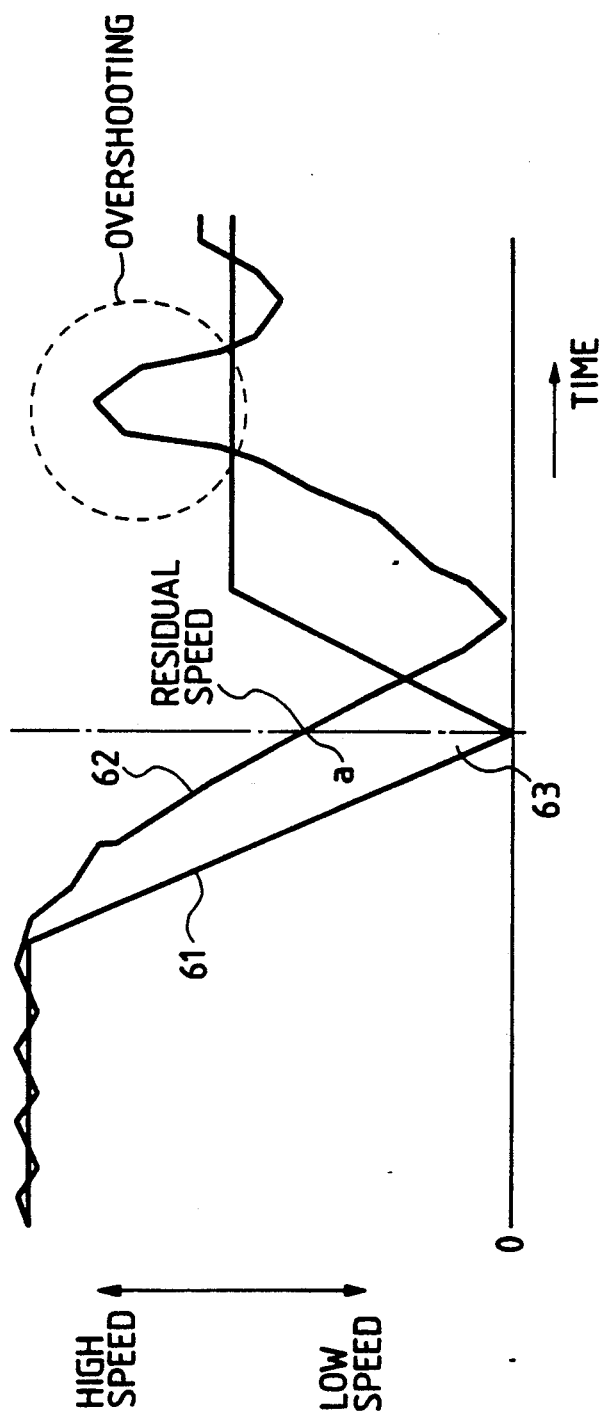
FIG. 15 is a chart showing the instructed speed and the actual speed of a conventional carriage motor.

When said bubble 51 grows to maximum as shown in FIG. 14D, an ink droplet 52 is pushed out from the discharge opening of the liquid path 4d. When the energization of the electrothermal converter 4b is terminated, the grown bubble 51 shrinks by cooling with ink 50 as shown in FIG. 14E, and an ink droplet flies from the discharge opening by the growth and shrinkage of said bubble. As the electrothermal converter 4b is rapidly cooled by the contact with ink as shown in FIG. 14F, the bubble 51 vanishes or shrinks to a negligible volume. As said bubble 51 shrinks, ink is supplied to the liquid path 4d by capillary action from the common liquid chamber 4g as shown in FIG. 14G, in preparation for the next energization.

Thus an ink image can be recorded on the recording sheet, by reciprocating the carriage 5 supporting said recording head 4 and energizing said electrothermal converters 4b according to image signals and in synchronization with said reciprocating motion.

The structure of the recording means is not limited to the above-explained combination of discharge openings, liquid paths and electrothermal converters, but may also adopt a structure having the heat acting area in a bent portion, as disclosed in the U.S. Pat. No. 4,558,333 and in the Japanese Laid-Open Patent Sho 59-123670.

Also in the above-explained recording means, the ink may be supplied to the recording head from an ink cartridge mounted in the recording apparatus, or there may be employed a disposable recording head which incorporates an ink chamber therein and is replaced when the ink in said ink chamber is used up.

The recording apparatus of the present invention is usable not only as an image output terminal for an information processing equipment such as a computer, but also as a copying machine in combination with an image reader, or a facsimile apparatus with data transmission/reception capabilities.

The foregoing embodiments have employed an ink jet recording head, but the present invention is not limited to such recording head and may also employ other recording heads, such as those for thermal recording, thermal transfer recording, wire dot recording or electrostatic recording.

As will be apparent from the foregoing, the above-explained embodiments enable stable and reliable carriage drive control in a serial printer.

Although the foregoing embodiments have been limited to the drive for a carriage supporting the recording head, the present invention is not limited to such drive, but is naturally applicable for example to the rotation control of a motor employed for driving a recording medium such as recording paper.

As detailedly explained in the foregoing, the present invention employs motor speed control means for a closed-loop control of the rotating speed of a carriage motor, in a recording apparatus for effecting a recording operation by moving a carriage, supporting a recording head, along the recording material, and sets the speed control output from said motor speed control means at a predetermined value when said carriage motor reaches, from an acceleration state, the speed in the constant speed state. Thus there can be provided a recording apparatus capable of suppressing the overshooting phenomenon after the speed of the constant speed state is reached, even in case of rapid acceleration of the carriage for reducing the time required therefor, thereby improving the throughput and avoiding the distortion in image recording.

What is claimed is:

1. A recording apparatus effecting movement of a recording head by causing a scanning motion for recording, said apparatus comprising:
    a carriage supporting said recording head;
    a stepping motor for moving said carriage;
    detection means for detecting rotary angular positions of a rotor of said stepping motor, said detection means generating a pulse signal at every rotation of a predetermined angle of said rotor;
    control means for detecting a rotation speed of said stepping motor by using a pulse signal from said detection means and obtaining a speed error of said stepping motor, the speed error being based on the detected rotation speed and a speed instructed to said stepping motor, the control means calculating an
    integrated error value from the speed error of said stepping motor, generating a control output, the control output being a sum of the speed error and the integrated error value, and making the control output to said stepping motor equal to a predetermined value when the rotation speed of said stepping motor reaches a constant value.

2. An apparatus according to claim 1, wherein said control means discriminates whether a rotational direction of said stepping motor is equal to an instructed rotational direction in which said stepping motor is instructed to rotate and, in a case where the rotational direction is not equal to the instructed rotational direction, said control means increases the speed error.

3. An apparatus according to claim 1, wherein, when the rotation speed of said stepping motor has reached a constant speed to be controlled, said control means sets the integrated error value to a constant, thereby making the control output to said stepping motor a predetermined value.

4. An apparatus according to claim 3, wherein the predetermined value for the integrated error value is an average of the integrated error value determined in a constant speed control in at least an immediately preceding recording line.

5. An apparatus according to claim 1, wherein said recording head is an ink jet recording head.

6. An apparatus according to claim 5, wherein said ink jet recording head is a bubble jet recording head including electrothermal converters for effecting recording by discharging ink by growth of bubbles.

7. A recording apparatus effecting movement of a recording head by causing a scanning motion for recording, said apparatus comprising:
    a carriage supporting said recording head;
    a stepping motor for moving said carriage;
    detection means for detecting rotary angular positions of a rotor of said stepping motor, said detection means generating a pulse signal at every rotation of a predetermined angle of said rotor;
    control means for counting pulse signals from said detection means, thereby detecting a position of said carriage, and releasing a speed instruction signal for said stepping motor;
    current switching means for counting the pulse signals from said detection means, and for switch controlling an energizing current to be supplied to coils of said stepping motor according to the counted pulse signals; and
    speed control means for obtaining a speed error by comparing a reference time period corresponding to the speed instruction signal from said control means and a time period of pulse signals from said detection means, said speed control means obtaining an integrated error value from the speed error of said stepping motor and outputting to said stepping motor a speed control signal corresponding to a sum of the speed error and the integrated error value and making the speed control signal equal to a specified value when said stepping motor changes from an accelerating state to a constant speed state.

* * * * *

UNITED STATES PATENT AND TRADEMARK OFFICE
CERTIFICATE OF CORRECTION

PATENT NO. : 5,245,359

DATED : September 14, 1993

INVENTOR(S) : Noriaki ITO, et al.

Page 1 of 2

It is certified that error appears in the above-identified patent and that said Letters Patent is hereby corrected as shown below:

AT [57] ABSTRACT:
  Line 2, "carriage" should read --carriage,--.

COLUMN 2:
  Line 10, "4,928,050" should read --4,928,050,--;
  Line 65, "reaches,zero," should read --reaches zero,--.

COLUMN 4:
  Line 42, "includes" should read --includes,--;
  Line 68, "4." should read --5.--.

COLUMN 5:
  Line 6, "carriage 6" should read --carriage 5--;
  Line 10, "carriage 6." should read --carriage 5.--;
  Line 16, "head 6" should read --head 4--.

UNITED STATES PATENT AND TRADEMARK OFFICE
CERTIFICATE OF CORRECTION

PATENT NO. :  5,245,359                Page 2 of 2
DATED      :  September 14, 1993
INVENTOR(S):  Noriaki ITO, et al.

It is certified that error appears in the above-identified patent and that said Letters Patent is hereby corrected as shown below:

COLUMN 6:

Line 5, "IVe, is" should read --Ive is--.

COLUMN 13:

Lines 48 and 49, should be merged into one paragraph.

Signed and Sealed this

Fourteenth Day of June, 1994

Attest:

BRUCE LEHMAN

Attesting Officer       Commissioner of Patents and Trademarks